UNITED STATES PATENT OFFICE 2,584,264

PROCESS FOR CURING COATINGS OF POLYSULFIDE POLYMERS

William S. Foulks, Philadelphia, Pa., assignor to Thiokol Corporation, a corporation of Delaware No Drawing. Application June 20, 1945, Serial No. 600,638

8 Claims. (Cl. 117—62)

This application relates to polysulfide polymers, more particularly those which are capable of existing in liquid form under normal conditions, e. g., at about 25° C.

The polythiopolymercaptans are particularly well suited as coating and/or impregnating media for surfaces, fabrics, sheet material in general, and the like where a coating or impregnant substantially immune or highly resistant to the action of solvents, e. g., motor fuel, benzol, etc. is desired. The liquid polythiopolymericaptans have the advantage that while they are normally not only liquid but also soluble in a number of solvents, they may be converted into an inert, insoluble condition. The normal characteristics of liquidity and solubility make it possible to effectively coat surfaces, fill interstices, etc., even when the latter are in relatively inaccessible locations. Thereafter the liquids may be converted into an advanced stage of polymerization or condensation characterized by insolubility and inertness possessing corresponding protective value.

One method of making the liquid polythiopolymercaptans will be described as shown below in order that the art may be instructed how to make a liquid polythiopolymercaptan to which the treatment of the present application may be applied.

The general principle of this method is the oxidation of polymercaptans and the control of this reaction so that the product is obtained within a range of molecular size or weight corresponding to a condition of liquidity at ordinary room temperature. Organic substances in general having two or more carbon attached SH groups may be chosen for oxidation. Reference to Patent No. 2,142,145, to Patrick, January 3, 1939, shows a long list of monomeric polymercaptans containing two SH groups. Any of these substances are suitable for making the liquid polythiopolymercaptans by oxidation. Oxidizing agents in general may be used, as shown in said patent, under alkaline conditions.

In order to control the course of the reaction to obtain the desired product in liquid reactive form, the proportion of oxidizing agent is limited so that the number of atoms of available oxygen equals $$\frac{n-1}{n}$$

per mol of monomeric mercaptan where $n$ equals the number of units in the liquid polymer.

The general formula of the liquid polymer is $HS(RSS)_{n-1}RSH$ where R is the structure of the monomeric mercaptan minus the —SH groups thereof and $n$ is the number of units in the polymer.

The polymeric unit is (RSS) and R has skeleton carbon structure which may be a single carbon atom

or two adjacent carbon atoms

or two carbon atoms joined to and separated by intervening structure and represented by the symbol

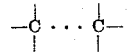

Such symbolism has been frequently used to identify the polysulfide polymers. See Patrick Patents 2,216,044, and 2,195,380. It will be seen that since liquidity is determined by molecular size and molecular size is determined by the number of units, that a method of control whereby a monomeric polymercaptan can be condensed or polymerized to produce a polymer having a given number of units, offers a means of producing liquid polymers having any desired molecular weight. While there is no precise upper limit corresponding to liquidity (in the absence of solvents) it is in the neighborhood of 7000–8000.

The preparation of a polymer having approximately seven of the units (RSS) will be illustrated by the preparation of a polythiopolymercaptan having the formula

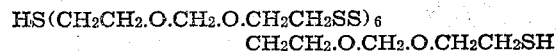

This has a molecular weight of about 1200, determined cryoscopically.

The accuracy of controlling molecular size by the method indicated is shown by the fact that seven of the units of this polymer, i. e., $7 \times (CH_2.CH_2.O.CH_2.O.CH_2CHSS)$ have a molecular weight of 1162 whereas the actual theoretical molecular weight is 1164.

*Example I.—Preparation of the liquid polymer*

In this particular example, the preparation of a polymer having a molecular weight of about 1200 will be described but it will be understood that the molecular weight may vary over quite a wide range, i. e., the condition of liquidity is consistent with polymers having a rather wide range of molecular weights as, for example, from that of dimers up to polymers containing a large number of polymeric units and having a molecular weight up to about 7000. In this particular example the polymer will be prepared by the oxidation of dimercapto diethyl formal—

$$HSCH_2CH_2OCH_2OCH_2CH_2SH$$

Seven and one-half mols of dimercapto diethyl formal are dispersed in water to which is added 14 mols of sodium hydroxide and the dispersion so formed is carefully protected from atmospheric oxidation. To the dispersion, while rapidly being stirred, is added a solution of hydrogen peroxide containing 6.5 mols of $H_2O_2$ and therefore equivalent to 6.5 atoms of available oxygen. The reaction takes place at room temperature and after the addition of the hydrogen peroxide solution is continued for about 15 minutes using a water bath when necessary to prevent the temperature from rising above about 60° C. At the end of the reaction period, the reaction liquid is treated with a solution of acetic acid containing 15 mols of acetic acid or slightly more than the equivalent required to neutralize the reaction liquid which is then allowed to settle and the supernatant liquid poured off. The oily layer is then purified by successive washings with water and intermittent settling of decantation.

Some of the properties of this product produced above are listed as follows:

| | |
|---|---|
| Specific gravity at 20/20° C | 1.275 |
| pH | Slightly acid |
| Viscosity at 20° C., centipoises | About 2000 |
| Molecular weight, average | 1200 |
| Pour point | 24° C. |
| Vapor pressure at 20° C., mm. Hg | 0.01 |
| Color | Amber |
| Solubility in water at 20° C | Insoluble |
| Avenue weight per gal. at 20° C. lb | 10 |

SOLUBILITIES

| | |
|---|---|
| Acids, organic | Insoluble cold—soluble hot |
| Alcohols, saturated | Insoluble cold—insoluble hot |
| Alcohols, unsaturated | Soluble cold—soluble hot |
| Aldehydes | Soluble cold—soluble hot |
| Hydrocarbons, aliphatic | Insoluble cold—soluble hot |
| Hydrocarbons, aromatic | Soluble cold—soluble hot |
| Hydrocarbon, chlorinated | Soluble cold—soluble hot |
| Amines | Soluble cold—soluble hot |
| Esters | Soluble cold—soluble hot |
| Ethers | Soluble cold—soluble hot |
| Ketones | Soluble cold—soluble hot |
| Nitroparaffin | Soluble cold—soluble hot |
| Nitrites | Soluble cold—soluble hot |
| Olefins, aliphatic | Insoluble cold—insoluble hot |
| Olefins, aromatic | Soluble cold—soluble hot |
| Phenols | Soluble cold—soluble hot |
| Mercaptans | Soluble cold—soluble hot |

Since the product is a polymercaptan, it is, like the monomeric mercaptans, responsive to oxidation under alkaline conditions. In accordance with the present application the polythiopolymercaptan may be applied to a surface in the form of a film. The alkaline condition is supplied by exposing the film to an alkaline substance in the vapor phase, e. g., ammonia or volatile amines. The oxidizing condition may be supplied by air, oxygen, or other gaseous oxidizing agent or by a liquid or solid oxidizing agent mixed with the polymer prior to filming it, or both. Preferably a solid or liquid oxidizing agent is mixed with the polymer prior to filming it. It is the oxidizing function that is important rather than the specific nature of any particular oxidizing agent, in conjunction with alkaline conditions.

It has been found that mixtures of the polymer and certain oxidizing agents are stable when substantially anhydrous. They may be stored and transported and become activated upon exposure to moist alkaline conditions.

*Example II.—Conversion of the polymer from its liquid soluble stage to an advanced or final and insoluble stage of polymerization while in the form of a film*

The polymer produced as in Example I is filmed out on any surface which it is decided to coat and the film thus obtained is treated with a volatile alkaline material such as ammonia. The polymerization takes place as a result of the action of the alkaline material in the presence of the moisture and oxygen of the air and the complete polymerization is usually finished over a period of from five to seven hours at room temperature.

*Example III*

100 parts of the polythiopolymercaptan prepared as in Example I are carefully dried and then mixed with 25 parts by weight of dry zinc chromate. This is a stable mixture and may be stored and transported. When used it is filmed out, e. g., applied to a surface as a coating, e. g., as a coating for a tank or container for high test gasoline. The interior coated surfaces of the tank are then exposed to the vapor of ammonia and moisture. The polythiopolymercaptan then reacts with the oxidizing agent and is converted into a solid film insoluble in all ordinary solvents such as benzol, high test motor fuel, etc. Instead of zinc chromate, zinc peroxide may be used.

I claim:

1. Process of providing the surface of a body with a protective coating which comprises coating said surface with a substantially anhydrous liquid coating mixture comprising a polyalkylene polysulfide containing at least two carbon-attached —SH groups, said polyalkalene polysulfide existing at 25° C. in a liquid condition and being mixed with an oxidizing agent selected from the group consisting of zinc chromate and zinc peroxide and hardening said coating by exposing it to the action of an alkaline agent selected from the group consisting of ammonia and the volatile amines.

2. Process of providing the surface of a body with a protective coating which comprises coating said surface with a substantially anhydrous liquid coating mixture comprising a polyalkylene polysulfide containing at least two carbon-attached —SH groups, said polyalkylene polysulfide existing at 25° C. in a liquid condition and being mixed with an oxidizing agent selected from the group consisting of zinc chromate and zinc peroxide and hardening said coating by exposing it to the action of ammonia.

3. Process of providing the surface of a body with a protective coating which comprises applying to said surface a film of a substantially anhydrous polyalkylene polysulfide containing at least two carbon attached —SH groups and capable of existing in a liquid condition at about 25° C. with which liquid polymer a zinc chromate oxidizing agent has been incorporated, and hardening said film by treating it with ammonia vapor.

4. Process of providing the surface of a body with a protective coating which comprises applying to said surface a film of a substantially anhydrous polyalkylene polysulfide containing at least two carbon attached —SH groups and capable of existing in a liquid condition at about 25° C. with which liquid polymer a zinc peroxide oxidizing agent has been incorporated, and hardening said film by treating it with ammonia vapor.

5. Process of providing the surface of a body with a protective coating which comprises applying to said surface a film of a substantially anhydrous polyalkylene polysulfide containing at least two carbon attached —SH groups said polyalkylene polysulfide having a molecular weight not greater than about 8000 with which a zinc chromate oxidizing agent has been incorporated, and hardening said film by treating it with gaseous ammonia.

6. Process of providing the surface of a body with a protective coating which comprises applying to said surface a film of a substantially anhydrous polyalkylene polysulfide containing at least two carbon attached —SH groups said polyalkylene polysulfide having a molecular weight not greater than about 8000 with which a zinc peroxide oxidizing agent has been incorporated, and hardening said film by treating it with gaseous ammonia.

7. Process of providing the surface of a body with a protective coating which comprises coating said surface with a substantially anhydrous liquid coating mixture comprising a polyalkylene polysulfide, containing at least two carbon attached —SH groups said polyalkylene polysulfide existing at 25° C. in a liquid condition, mixed with a zinc chromate oxidizing agent and hardening said coating by exposing it to the action of ammonia in vapor form.

8. Process of providing the surface of a body with a protective coating which comprises coating said surface with a substantially anhydrous liquid coating mixture comprising a polyalkylene polysulfide, containing at least two carbon attached —SH groups said polyalkylene polysulfide existing at 25° C. in a liquid condition, mixed with a zinc peroxide oxidizing agent and hardening said coating by exposing it to the action of ammonia in vapor form.

WILLIAM S. FOULKS.

REFERENCES CITED

The following references are of record in the file of this patent:

UNITED STATES PATENTS

| Number | Name | Date |
| --- | --- | --- |
| 2,282,948 | Deitzel | May 12, 1942 |
| 2,386,287 | Blanco | Oct. 9, 1945 |
| 2,402,977 | Patrick | July 2, 1946 |
| 2,426,917 | Barr et al. | Sept. 2, 1947 |

FOREIGN PATENTS

| Number | Country | Date |
| --- | --- | --- |
| 975 | Great Britain | 1913 |

OTHER REFERENCES

Formation of High Polymers, J. C. Patrick, Transactions of the Faraday Soc., vol. 32, pages 347–358, January 1936.